No. 630,030. Patented Aug. 1, 1899.
T. J. CALLAHAN.
PLANTER.
(Application filed June 17, 1898.)
(No Model.) 2 Sheets—Sheet 1.
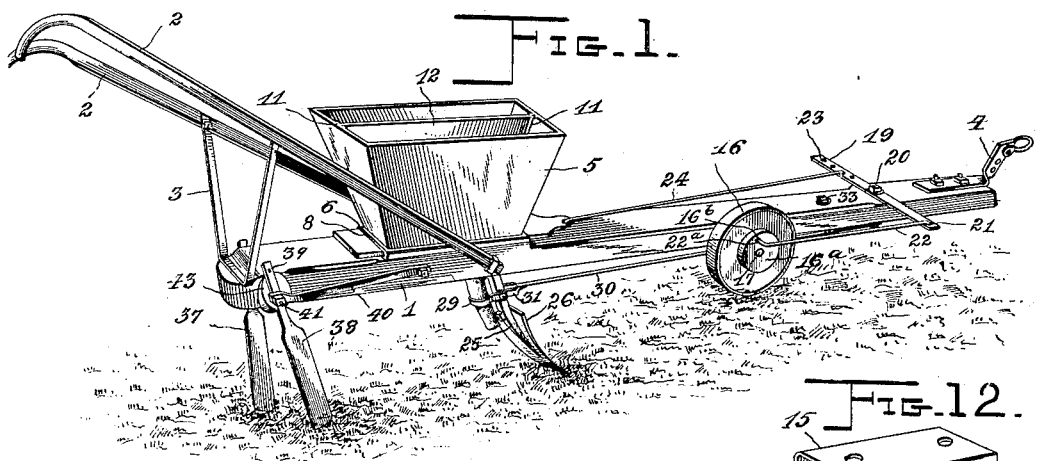
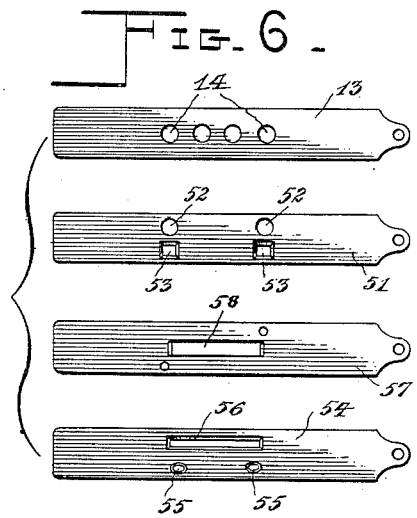
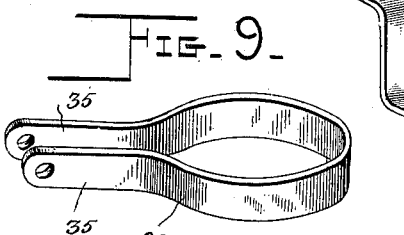
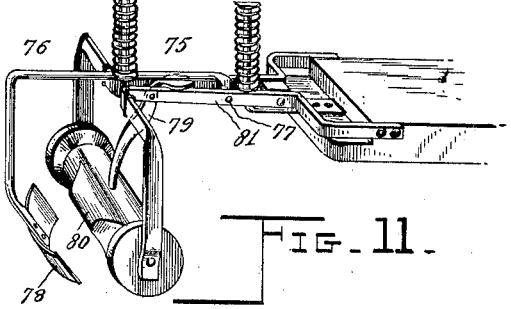

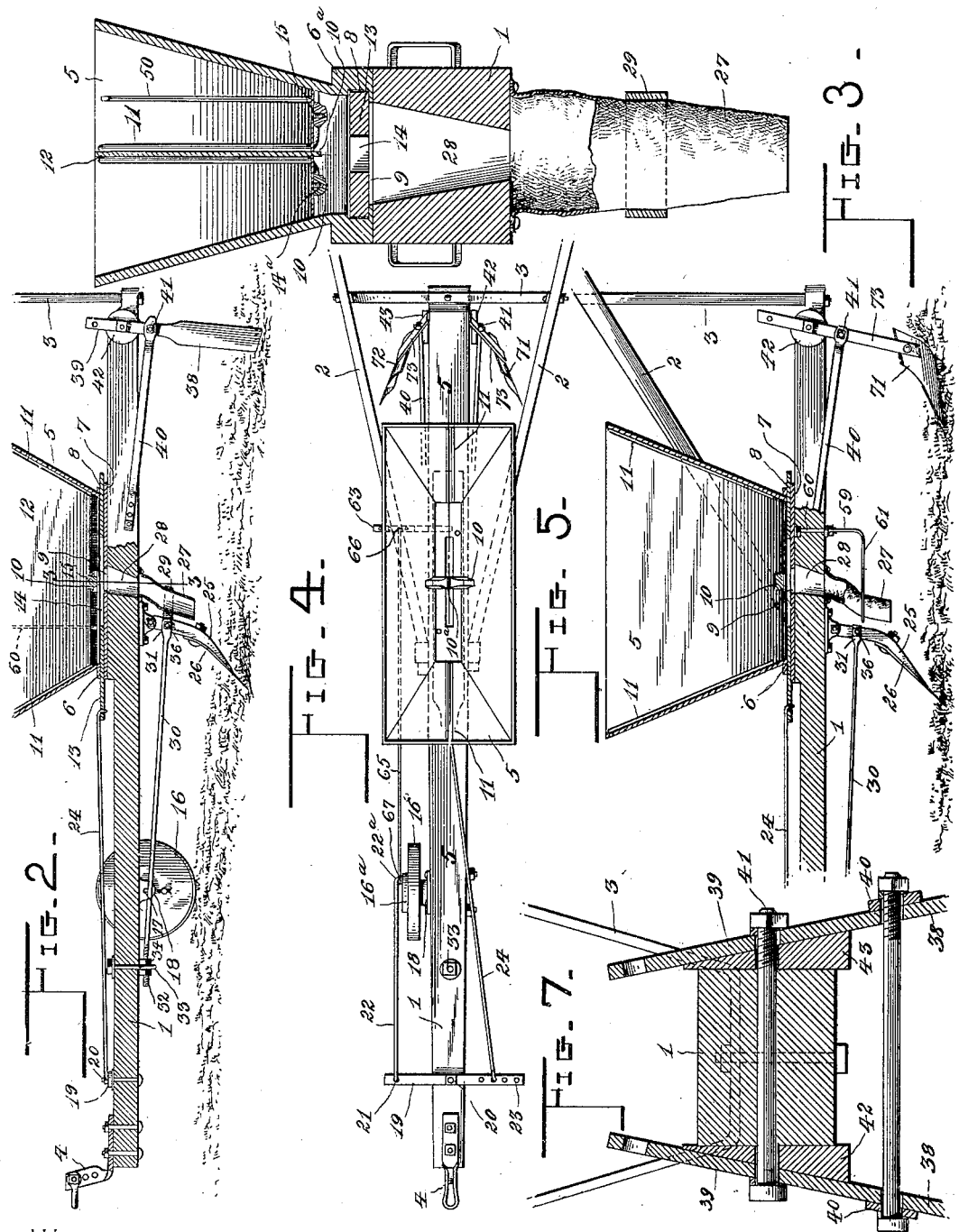

UNITED STATES PATENT OFFICE.

THOMAS JEFFERSON CALLAHAN, OF FOREST DEPOT, VIRGINIA.

PLANTER.

SPECIFICATION forming part of Letters Patent No. 630,030, dated August 1, 1899.

Application filed June 17, 1898. Serial No. 683,746. (No model.)

*To all whom it may concern:*

Be it known that I, THOMAS JEFFERSON CALLAHAN, a citizen of the United States, residing at Forest Depot, in the county of Bedford and State of Virginia, have invented a new and useful Planter, of which the following is a specification.

My invention relates to improvements in planters and fertilizer-distributers which may be used for planting corn in hills and distributing or drilling fertilizer; but the machine is more especially useful in preparing land for planting tobacco.

Among other objects of the invention I aim to provide means by which corn may be planted singly or may be dropped or drilled in connection with fertilizer, as well as to drill fertilizer for tobacco-planting; to provide means by which the quantity of fertilizer discharged and the intervals of the dropping of the corn may be regulated within desired limits; to provide means by which fertilizer may be distributed broadcast for listing the ground preparatory to tobacco-planting, as well as to deposit the fertilizer in the hills or furrow with the corn; to secure nicety of adjustment to the furrow-opener for regulating the penetration thereof; to provide means by which the soil may be covered upon the grain or the ground listed for tobacco-planting; to provide adjustable means which serve to indicate to the operator the proper places for setting tobacco-plants; to provide a hilling attachment by which the soil and fertilizer may be scooped up into the hills at proper uniform distances one from the other, and, finally, to simplify the construction with a view to promoting the efficiency of the machine and making it easy of adjustment and control.

With these ends in view the invention consists in the novel combination of elements and in the construction and arrangement of parts, which will be hereinafter fully described and claimed.

To enable others to understand the invention, I have illustrated the preferred embodiment in the accompanying drawings, forming a part of this specification, and in which—

Figure 1 is a perspective view of my implement adapted for service as a corn-planter. Fig. 2 is a vertical longitudinal sectional elevation taken centrally through the beam represented by Fig. 1. Fig. 3 is a vertical transverse sectional elevation on the plane indicated by the line 3 3 of Fig. 2. Fig. 4 is a plan view of the implement adjusted for service as a tobacco-planter. Fig. 5 is a longitudinal sectional view through the tobacco-planter on the plane indicated by the line 5 5 of Fig. 4. Fig. 6 is a series of views showing in plan a number of dropping-slides which are designed to be used interchangeably in a single hopper and in connection with the common driving mechanism for dropping corn with or without fertilizer and for drilling the fertilizer when planting corn or to prepare the ground for the reception of tobacco-plants. Fig. 7 is a vertical cross-section through the beam and the means by which the covering-blades or lister-shovels may be adjusted with relation to the beam. Fig. 8 is a detail perspective view of the agitator device for the seed tube or hose. Fig. 9 is a detail perspective view of the cup or clamp by which the seed tube or hose may be held in a stationary position when planting corn. Fig. 10 is a detail perspective of the carrying-bracket for the covering and crushing roller. Fig. 11 is a view of the hilling attachment adapted to be used in connection with the implement when it is desired to plant tobacco in hills. Fig. 12 is a detail perspective view of the brush-carrier which may be used in the hopper when planting corn.

Like numerals of reference denote like and corresponding parts in each of the several figures of the drawings.

1 designates the beam of the implement, which in all substantial respects is similar to ordinary plow-beams, and 2 are the handles, which are fastened to the beam and which are stayed by the brace 3, the front end of the beam being equipped with the usual clevis 4. On the beam is erected a hopper 5, which is cast in a single piece of metal with an offset base 6, the base being somewhat wider than the transverse area of the hopper, which slopes inwardly from its upper end toward its bottom. To the base 6 is rigidly secured a flat horizontal base 7—as, for example, by rivets or screws—and the offset guides having the plates 7 united thereto provides a guideway 8 below the hopper. From the bottom of the hopper is provided a transverse slot 9, which opens into the guideway, and immediately over this slot the hopper is provided with a central bridge 10, which is preferably cast with the hopper. This bridge lies at a suitable distance above and over the discharge-slot 9, and it is adapted to sustain the partition 12 at a point intermediate of its length, or the bridge may carry a brushing device, to be hereinafter described, by which the corn is prevented from passing too freely into the apertures of the corn-dropping slide. The partition 12 is arranged longitudinally of the hopper, at the central part thereof, and said partition rests in a groove or seat $10^a$, provided on the bridge, and is confined in position between the inclined guideways 11, which are provided on the inner opposing faces of the end walls forming a part of the hopper 5. The partition is fitted removably to the guideways and the bridge-seat, and when the implement is to be used for drilling fertilizer preliminary to planting tobacco or for dropping corn without discharging the fertilizer the partition 12 is removed from the hopper. To drill fertilizer with the corn or to drop the corn and fertilizer simultaneously, the partition is fitted to the hopper for the purpose of dividing the same into longitudinal compartments, one of which is designed to contain the corn to be planted, and the other is for the reception of the fertilizer which may be drilled or dropped with the corn.

The corn-dropping slide is indicated by the numeral 13 in Figs. 2, 3, and 6 of the drawings, and said slide is fitted removably in the guideway 8 in the bottom of the hopper. The slide 13 is provided with a series of central apertures 14, into which the corn may be deposited as the slide reciprocates beneath the slot 9 of the hopper, and to prevent the corn from passing too freely through the slot 9 I employ the brush-carrier 15, which is in the form of a sheet-metal bent clip arranged to straddle the bridge 10 and to be held in place thereon by a suitable clamp—as, for instance, by the set-screw $14^a$. This brush-carrier is equipped with one or more brushes $15^a$, arranged to sweep close to the face of the slide, and the brush and the carrier may be readily detached from the bridge when the machine is to be used for drilling fertilizer.

On one side of the beam 1, in advance of the hopper supported thereby, I employ a ground-wheel 16, which is formed with a broad tread and is hollowed out on one face thereof to accommodate a crank-disk $16^a$, which is integral with the hub of the wheel and is arranged to lie in the plane of one edge of the wheel-tread. This ground-wheel is secured to an axle 17, which is journaled in a bearing 18, rigidly secured to the under side of the beam, and on the front end of the beam is arranged the horizontal lever 19, which extends transversely across said beam to have the ends extend from opposite sides thereof. This lever is fulcrumed at a point intermediate of its length by a bolt 20, and in one end of the lever is provided a single aperture 21, in which is fitted a prong at one end of a link 22, said link having at its other end a crank-pin $22^a$, which is fitted in an aperture $16^b$ of the crank-disk $16^a$, whereby the lever 19 is operatively connected with the ground-wheel to be actuated thereby as the machine is drawn across the field. In the other arm of the operating-lever 19 is provided a series of apertures 23, to either one of which may be fitted removably a pin or stud of a pitman 24, which extends rearwardly from the lever and is detachably connected to the front end of the dropping-slide in the hopper. The pitman 24 has a shiftable connection with the long arm of the operating-lever 19, and it is detachably connected to the slide and to said lever 19. This is advantageous in that provision is made for the use interchangeably of a series of slides in the hopper, and the employment of the slide may be regulated by adjusting the pitman 24 toward or from the fulcrum 20 of the operating-lever 19, thus enabling more or less fertilizer to be discharged, and regulating the distance of planting the corn in the furrows.

25 designates the stock, which is solidly fastened to the under side of the beam at a point in advance of the hopper, and this stock is constructed with a furrow-opener 26, designed to open the ground for the reception of the corn or fertilizer. By making this furrow-opener of substantial construction the implement may be used as a subsoiling-plow.

The corn or fertilizer discharged from the hopper is directed into the furrow through a flexible seed tube or hose 27, the upper end of which is suitably attached to the under side of the beam in a way to communicate with a slot 28 in said beam, and to this slot 28 is delivered the corn or fertilizer from the dropping-slide which may be contained in the hopper. To use the machine for planting corn or for distributing fertilizer in connection with the corn, I provide means by which the seed tube or hose may be held in a relatively stationary position to insure a proper deposit of the corn or fertilizer in the furrow opened by the shovel 26, and to this end a cuff or clamp 29 is arranged to embrace the flexible seed-tube 27 for restraining the latter against movement or vibration. The stock 25 is preferably pivoted at its upper end to a bracket which is fixed to the beam, and said stock is held in position by means of an adjustable brace 30, which lies on the under side of the beam. The rear end of this adjustable brace is forked or bifurcated at 31 to embrace the sides of the stock 25, while the other end of said brace is threaded, as at 32, and is fitted in the eye of an eyebolt 33, rigidly secured to the beam at a suitable distance in rear of the operating-lever 19. The threaded end of the adjustable brace passes loosely through the eyebolt, and it receives the adjusting-nuts 34, which are screwed on said brace to lie on opposite sides of the eyebolt. The threaded end of the brace and the described arrangement of the nuts 34 insure nicety of adjustment for the brace 30 and enable the stock 25 to be adjusted to better advantage for regulating the penetration of the ground than can be attained by the employment of a pin or bolt to fit in the series of apertures in the brace.

The cuff or clamp 29, which embraces the flexible seed-tube 27, is forked at its front end, as indicated at 35, for the purpose of embracing the forked rear end 31 of the adjustable brace 30, and through the overlapping forked ends of the brace and clamp is passed a single fastening-bolt 36, which serves to attach the brace and cuff to the stock 25, thus simplifying the construction and providing for the ready detachment of the cuff 29 when it is desired to use an agitator for the purpose of vibrating the flexible tube or hose 27 in order to insure broadcast distribution of the fertilizer to prepare the land for tobacco-planting.

At the rear end of the beam and on opposite sides of the vertical plane of the flexible tube or hose 27 I arrange the adjustable covering-shovels 37 38. Each shovel is constructed with a shank 39, that lies adjacent to the face or side of the beam 1, and braces 40 are employed for attachment to the shanks of said covering-shovels. The front ends of the braces are rigidly secured to the beam by a suitable bolt or bolts, while the rear end of said braces are fastened to the shovel-shanks by bolts 41, which pass through the shanks, the braces, and the beams. Adjusting wedge-shaped disks 42 43 are interposed between the sides of the beam and the shovel-shanks for the purpose of varying the vertical inclination of the shovel-shanks with relation to the beam. Each disk is made wedge-shaped in cross-section, so as to present a thin edge on one side and a thick edge on the opposite side, and said disk is fitted loosely on one of the bolts 41, so that it may be turned thereon to different positions for the purpose of determining the angular relation of the shovel-shank to the vertical plane of the beam 1. The disks 42 and 43 may be turned to variable positions on the bolt 41 to incline the covering-shovels inwardly toward each other or to spread them farther apart, so as to regulate the amount of soil that will be thrown inwardly to cover the corn or fertilizer deposited in the furrow.

The covering-roller 44 is arranged to trail in rear of the beam for the purpose of packing the ground thrown inwardly by the covering-shovels, as well as to crush and break any lumps or clods. This covering-roller is constructed with a wide concave tread-surface, and it is arranged in a horizontal position to extend across the paths described by the covering-shovels 37 38. Said roller is journaled in a hanger 45, which is constructed with a shank 46, that is forked or bifurcated to provide the spaced arms 46ª. These arms extend on opposite sides of the beam 1, at the rear end thereof, and they are fitted loosely on one of the bolts 41, thus pivotally attaching the hanger to the beam. A vertical guide-stem 47 is fixed securely to said rear end of the beam, and it passes loosely through the forked shank 46 of the roller-hanger. A coiled spring 48 is fitted loosely on the vertical guide-stem to have its lower end seated upon the shank 46 of the roller-hanger, and this spring is held in place by an adjusting-nut 49, which is screwed to the upper threaded extremity of the guide-stem 47, whereby the stem serves to hold the hanger in proper relation to the beam, and the spring keeps the roller pressed firmly upon the ground to enable it to perform its work of pressing the soil upon the furrow and packing the soil around the grain.

The dropping-slide 13, which works in the hopper, is provided with stirrers or agitators 50, which are adjustably secured to said slide 13. My machine is constructed for service with a series of interchangeable slides, which are shown more clearly by Fig. 6 of the drawings. The slide indicated by the numeral 13 is designed for dropping corn only; but when it is desired to drop corn and fertilizer simultaneously in the furrow I employ the slide indicated by the numeral 51, which slide is provided with a series of corn-openings 52 and the slots 53, which are arranged in line with the openings 52 transversely across the slide. In using a slide of this type in the hopper it is necessary to employ the partition 12, which is removably secured in the guideways and upon the bridge of the hopper to divide the latter into compartments adapted to contain corn and fertilizer, respectively, and the fertilizer is placed in the compartment immediately over the slots 53 in the side, while the grain is in its compartment, with which the apertures 52 communicate. For drilling fertilizer when the corn is dropped I employ the slide indicated at 54 in Fig. 6. This slide is constructed with a continuous longitudinal slot 56 at one side of the vertical plane of the corn-openings 55 in said slide, and the slide 54 is used in connection with the hopper, which is divided by the partition 12.

For drilling fertilizer to prepare the ground for tobacco-planting the slide 57 is used in connection with the stirrers or agitators 50. This tobacco drilling slide for fertilizer is constructed with a central longitudinal slot 58, and the slide is placed in the bottom of the hopper, the partition of which is removed. All the slides shown by Fig. 6 are of corresponding form and dimensions to enable either of them to readily fit in the guideway of the hopper, and each slide is provided at its front end with a perforated nose, to which the rear end of the pitman 24 may be detachably connected.

When using my implement for planting tobacco, I dispense with the covering-shovels 37 38 and the cuff or clamp 29, which holds the flexible tube or hose in a stationary position. In lieu of these devices I equip the machine with the listing-shovels 71 and 72 and employ an agitator 59 for giving to the flexible tube or hose a vibratory motion transversely across the longitudinal axis of the beam, so as to effect the broadcast distribution of the fertilizer upon the soil.

The agitator 59 is in the form of a lever arranged in a horizontal position beneath the beam at a point adjacent to the flexible tube or hose 27, and this lever is fulcrumed at a point intermediate of its length by a bolt 60, which passes loosely through the lever and is attached to the beam. One arm 61 of the lever is bent to the irregular form shown by the drawings, and its free end is curved or provided with a loop 62, which is arranged to loosely embrace the flexible tube or hose 27, so as to cause the latter to move or play with the lever. The other arm 63 of the agitator-lever extends outwardly from the beam, and it is formed with a series of apertures 64, in either one of which may be fitted a prong 66 at the rear end of the agitator-pitman 65. This pitman extends alongside of the beam, and its front end is formed with an eye 67, which is loosely fitted on the crank-pin 22ª of the link 22, which is arranged between the crank-disk 16ª and the operating-lever 19 for the dropper-slide, whereby the link 22 is adapted through the lever 19 to actuate the dropper-slide, while the pitman 65 is operatively connected with the agitator-lever 59 to vibrate the flexible tube or hose 27 in a direction transversely across the beam, both pitmen 22 and 65 being actuated from a single crank-disk, which rotates with the ground-wheel 16. In my tobacco-planter the covering blades or shovels 37 and 38 are detached from the bolts 41 and the braces 40, and they are replaced by the standards 73, which are properly fitted to the bolts 41 to lie against the adjusting-wedges 42 43, so as to be attached by the bolts and the braces to the beam. The lister-shovels 71 72 are rigidly secured to the lower ends of the standards 73 by any suitable means, and each lister-shovel is arranged to have its horizontal ends lie parallel to the ground-line. Said lister-shovels are fashioned to provide convex working faces, and said shovels are arranged to have their working faces opposed to each other in order that they may throw the soil inwardly toward the furrow opened by the shovel on the stock 25. The lister-shovels may be adjusted inwardly toward each other, so as to regulate the quantity of dirt thrown into the list by turning the adjusting-wedges 42 43 on the bolts 41; but a reverse adjustment of the wedges serves to spread the standards and to throw the lister-shovels away from each other, thus increasing the quantity of soil accumulated by the shovels and thrown inwardly thereby into the list.

In the operation of my machine as a tobacco-planter the fertilizer is drilled from the hopper by the action of the positively-reciprocated slide 57, and the agitator-lever 59 serves to vibrate the flexible tube or hose, so as to distribute the fertilizer broadcast. The lister-shovels throw the soil and fertilizer inwardly into the list, thus effecting a thorough mixture of the soil with the fertilizer, and in practical operation the list is packed and fertilized by the action of the trailing spring-pressed roller 44.

To indicate to the operator the proper places where the tobacco-plants shall be set in the ground, I construct this roller 44 with a cup-shaped marker 74, which is detachably secured in a suitable way to the concave working face of the roller, and as the machine is drawn across the field the roller is rotated by frictional contact with the ground, so that the marker 74 indents the ground at regular intervals, thus indicating to the operator the places where the tobacco-plants are to be set.

The employment of the roller with the marker thereon prepares the ground for bedding tobacco-plants; but in some instances the operator may desire to set the tobacco-plants in hills. To provide for this contingency, I employ a hilling attachment, which is indicated in its entirety by 75 in Fig. 11 of the drawings. This hilling attachment comprises a carrying-arm 76, a scoop 78, attached to the heel of the carrying-arm, and the lifting-finger 79. To use the hilling attachment on the tobacco-planter, the carrying-arm 76 is pivotally connected by a bolt 77 to a hanger 81, attached to the rear end of the beam, and the lifting-arm 79 is adapted for use in connection with a lifting-finger 80 on the roller 44, said marker and lifting-finger being adapted for use interchangeably one with the other on the covering-roller. The carrying-arm 76 for the hilling attachment trails in rear of the beam and roller and is in operative relation to the lifting-finger 80 on the roller, so that as the roller is rotated in the transit of the implement across the field the lifting-finger operates at regular intervals on the lifting-arm to lift the arm 76 and the shovel or scoop 78 above the ground. This shovel or scoop is preferably of sheet metal rigidly attached to the arm 76, and the arm is pivoted to the hanger 81, which in turn is attached to the beam. The carrying-arm 76 is pivoted to the hanger and the arm which carries the spring that depresses the hanger. The lifting-arm 79 is pivoted at a point intermediate of its length to the hanger to have its short arm impinge against the carrying-arm 76, and the depending end of this lifting-arm 79 is in the path of the lifting-finger 80 on the roller. The shape of the scoop causes it to accumulate a certain quantity of the soil, which is thrown inwardly by the listing-shovels into the list, and in the progress of the machine the soil is retained within the scoop until the lifting-finger 80 and the roller act to raise the carrying-arm 76, thereby lifting the scoop away from the accumulated soil and permitting it to lodge in the form of a hill, into which the tobacco-plant may be set. The hilling attachment is actuated automatically to produce a series of hills at regular intervals apart, and the soil in each hill is thoroughly commingled with the fertilizer distributed broadcast by the action of the dropping-slide and the agitator device.

It will be understood that the agitator device, the covering-shovels, the series of slides, and the hose-retaining clamp are all detachably applied to the machine, so that they may be used interchangeably, according as the machine is to be used for distributing fertilizer when corn is planted or for drilling fertilizer for preparing the ground for tobacco-planting, and such interchange of the parts may be readily effected, because they are constructed to provide for their ready disengagement and assemblage to render the machine useful as a tobacco or corn planter.

Slight changes may be made in the form of some of the parts while their essential features are retained and the spirit of the invention embodied. Hence I do not desire to be limited to the precise form of all the parts as shown, reserving the right to vary therefrom.

Having thus described the invention, what I claim is—

1. In a planter substantially such as described, a hopper, a series of slides interchangeable one with the other and adapted for use individually with the hopper, a lever, and a pitman having a shiftable connection with said lever and detachably connected with a slide for giving variable stroke or movement to the slide, combined with a ground-wheel, and connections between the ground-wheel and lever to actuate the latter, as set forth.

2. In a planter, a hopper cast in a single piece with an integral base which is offset or widened transversely to the length of the hopper, and also provided with a bridge which is cast integral with said hopper and is arranged above the discharge-slot in the bottom of said hopper, and a plate united to the offset base portion of the hopper and forming therewith a guideway, in combination with a beam, a dropping-slide fitted to the guideway and plate of the hopper to reciprocate therein, a ground-wheel, and operative connections from the ground-wheel to the dropping-slide, substantially as described.

3. In a planter, the combination with a beam and a pivoted stock, of an adjustable brace-rod provided with a threaded front end and having at its rear end a fork which embraces the stock, a pivotal bolt connecting the forked end of the brace-rod detachably to the stock, an eyebolt fixed on the beam and receiving the threaded front end of said brace-rod, and the adjusting-nuts screwed on the brace-rod and bearing against opposite sides of the eyebolt, substantially as described.

4. The combination with a beam, a hopper and a flexible tube, of means substantially as described for vibrating said tube in a horizontal plane and transversely across the line of a furrow, substantially as described.

5. In a planter, a flexible tube or hose, and an agitator device connected with said flexible tube, in combination with a hopper having a dropper mechanism, and a driving device operatively connected with the agitator device, substantially as described.

6. In a planter, a flexible tube or hose carried by a beam, and a vibrating agitator device mounted on the beam and engaging with said flexible tube, in combination with a hopper having a dropper mechanism, a driving ground-wheel, operative connections between the ground-wheel and the dropper mechanism, and similar connections from the ground-wheel to the agitator device, substantially as described.

7. The combination with a hopper, a dropper mechanism and a ground-wheel, of a flexible tube or hose leading from the hopper, an agitator device loosely engaging with the flexible tube and arranged to vibrate the latter transversely across the furrow, and independent operative connections from the ground-wheel to the dropper mechanism and to the agitator device, substantially as described.

8. The combination with a ground-wheel and a flexible tube or hose, of an agitator-lever fulcrumed on the beam and having a loop which loosely engages with the flexible tube, and a link connection from the ground-wheel to the agitator-lever, substantially as described.

9. The combination with a beam, a ground-wheel, and a flexible tube or hose, of an irregularly-formed agitator-lever fulcrumed at a point intermediate of its length on the beam and having a loop-formed arm at one end which is loosely engaged with the flexible tube, and also provided with a series of apertures in its other arm, and a link connected at one end to the ground-wheel and having shiftable connection with the perforated arm of the agitator-lever, substantially as described.

10. The combination with a beam, a hopper, a dropper mechanism in said hopper and a ground-wheel, of a lever fulcrumed on the beam and operatively connected with the dropper mechanism, a link connected to said lever and provided with a crank-pin which is attached to the ground-wheel, an agitator-lever fulcrumed on the beam and having one arm loosely engaged with the flexible tube, and a pitman attached to the other arm of the agitator-lever and loosely fitted to the crank-pin of the link connection from the ground-wheel to the first-named lever, whereby the two pitmen are actuated from a single ground-wheel to vibrate both levers which control the dropper mechanism and the tube-agitator device, substantially as described.

11. The combination with a beam, shovel-standards arranged closely in relation to the beam, the bolts which fasten the shovel-standards to said beam, and wedge-adjusting disk interposed between the beam and the shovel-standards, whereby the standards may be adjusted laterally with respect to the beam, substantially as described.

12. The combination with a beam, of a bolt passing therethrough, the wedge-shaped adjusting-disks loosely fitted on the bolt to bear against opposite sides of the beam, shovel-standards fitted on the bolt and arranged to engage with said wedge-adjusting disks, braces attached to the beam and another bolt which attaches the braces to the shovel-standards, substantially as described.

13. The combination with a beam and shovels carried thereby to throw the soil inwardly, of a pivoted hanger attached to the beam, a covering-roller journaled in said hanger, and tension devices to normally depress the hanger and hold the covering-roller to its work, substantially as described.

14. The combination with a beam and shovels carried thereby to throw the soil inwardly over the furrow, of a hanger pivoted on the beam, a fixed guide-stem passing through the hanger, a spring fitted to the guide-stem and seated upon the hanger to normally depress the latter, and a covering-roller journaled in the hanger and provided with a removable indenting-marker, substantially as described.

15. The combination with a beam and a presser-roller carried thereby, of a lifting-finger attached to said roller, a pivoted arm lying in the path of said lifting-finger to be actuated at suitable intervals thereby, and a hilling-scoop attached to said carrying-arm, substantially as described.

In testimony that I claim the foregoing as my own I have hereto affixed my signature in the presence of witnesses.

THOMAS JEFFERSON CALLAHAN.

Witnesses:
ROBERT D. YANCEY,
LEON GOODMAN,
J. W. JAMERSON.